United States Patent
De Mattia

(10) Patent No.: US 9,138,976 B2
(45) Date of Patent: Sep. 22, 2015

(54) METHOD FOR OBTAINING A COMPOSITE MATERIAL PART INCORPORATING A TENSIONING STEP OF THE FILAMENTS AND TOOL FOR ITS IMPLEMENTATION

(71) Applicant: Airbus Operations SAS, Toulouse (FR)

(72) Inventor: Denis De Mattia, Basse Goulaine (FR)

(73) Assignee: Airbus Operations SAS, Toulouse (FR)

( * ) Notice: Subject to any disclaimer, the term of this patent is extended or adjusted under 35 U.S.C. 154(b) by 282 days.

(21) Appl. No.: 13/785,727

(22) Filed: Mar. 5, 2013

(65) Prior Publication Data
US 2013/0233470 A1 Sep. 12, 2013

(30) Foreign Application Priority Data
Mar. 12, 2012 (FR) ...................................... 12 52173

(51) Int. Cl.
B29C 70/56 (2006.01)
B29C 70/44 (2006.01)
B32B 37/16 (2006.01)

(52) U.S. Cl.
CPC ................ *B32B 37/16* (2013.01); *B29C 70/44* (2013.01); *B29C 70/56* (2013.01)

(58) Field of Classification Search
CPC .............................. B29C 70/44; B29C 70/56
USPC ........... 156/161, 160, 197, 285, 286; 264/571
See application file for complete search history.

(56) References Cited

U.S. PATENT DOCUMENTS

| | | | | |
|---|---|---|---|---|
| 4,475,976 A | * | 10/1984 | Mittelstadt et al. | 156/286 |
| 5,145,621 A | * | 9/1992 | Pratt | 264/571 |
| 5,348,602 A | * | 9/1994 | Makarenko et al. | 156/161 |
| 7,186,367 B2 | * | 3/2007 | Hou et al. | 264/571 |
| 2007/0098930 A1 | | 5/2007 | Krogager et al. | |
| 2008/0283177 A1 | | 11/2008 | Glain et al. | |
| 2010/0263789 A1 | | 10/2010 | Graeber | |
| 2010/0263818 A1 | | 10/2010 | Reis et al. | |

FOREIGN PATENT DOCUMENTS

| | | |
|---|---|---|
| DE | 102007058727 | 6/2009 |
| EP | 1775109 | 4/2007 |
| FR | 2689809 | 10/1993 |
| GB | 2243104 | 10/1991 |
| WO | 2008070621 | 6/2008 |

OTHER PUBLICATIONS

French Search Report, Oct. 30, 2012.

* cited by examiner

*Primary Examiner* — Jeff Aftergut
(74) *Attorney, Agent, or Firm* — Greer, Burns & Crain, Ltd.

(57) ABSTRACT

A method for obtaining a composite material part from a preform of layers of fibers pre-impregnated with resin stacked on top of one another on a tool, the preform being delimited by a lower surface, an upper surface, and a peripheral flank. The method includes attaching to the tool, after the last layer has been laid, a peripheral part comprising a wing adapted to cover the peripheral edge of the upper surface, so as to create, in the periphery of the preform, a peripheral cavity adjacent to the flank of the preform and, before the polymerization phase, to withdraw the gas present in the peripheral cavity so as to tension filaments of the preform by exerting a traction force at the ends of the filaments.

8 Claims, 2 Drawing Sheets

METHOD FOR OBTAINING A COMPOSITE MATERIAL PART INCORPORATING A TENSIONING STEP OF THE FILAMENTS AND TOOL FOR ITS IMPLEMENTATION

CROSS-REFERENCES TO RELATED APPLICATIONS

This application claims the benefit of the French patent application No. 12 52173 filed on Mar. 12, 2012, the entire disclosures of which are incorporated herein by way of reference.

BACKGROUND OF THE INVENTION

The present invention relates to a method for obtaining a composite material part incorporating a tensioning step of the filaments, as well as a tool for implementation of the method.

A composite material part is constituted of fibers embedded in a resin matrix. The invention more particularly relates to the manufacturing of a composite material part from a preform of pre-impregnated fibers subjected to a polymerization cycle during which the fiber preform is compressed and subjected to a rise in temperature.

For certain material composite parts, the preform is obtained by stacking, on a convex tool, layers of pre-impregnated fibers on top of one another, the fibers being placed according to orientations, predetermined as a function of the mechanical characteristics which are sought. According to a mode of operation, each layer is constituted of juxtaposed fiber strips, the fibers being oriented along one direction for each strip. Generally, the fibers are constituted of several filaments and the thickness of the strip can vary as a function of the weight per unit area, and more particularly the number of filaments per fiber.

When the laying surface of the strips is developable and/or presents a non-pronounced radius of curvature, the strip is in contact with the laying surface over its entire width and entire length. In this case, the filaments of the strips all have almost the same tension.

This is very different when the laying surface is not developable. This is particularly the case of the composite material walls having a dual curvature as the nose fuselage of an aircraft or parts having variable thicknesses such as a longeron of an aircraft wing which has a section, variable over its entire length.

In the case of a non-developable surface, there is a difference of length between a first trajectory imposed by the surface on the filaments located in the area of the edges of the strip and a second trajectory imposed by the surface on the filaments located in the area of the other edge of the strip. Insofar as the filaments of the strip are quasi-inextensible, the filaments arranged near one of the edges will be tensioned whereas the filaments arranged in the area of the other edge will be compressed and will thus undulate.

There is also non-uniformity of the tensions of the filaments when strips having a high weight per unit area, and thus a great thickness, are laid over a small radius of curvature on the order of 10 to 30 mm, for example. Indeed, the filaments arranged in the area of the inner radius are compressed and tend to undulate.

The non-uniformity of the tensions of the filaments trapped in the resin matrix after polymerization causes a decrease of the mechanical characteristics of the part being manufactured. Indeed, the progressive mechanical loading of such a part causes a traction force to be exerted only on the filaments tensioned at first, then by increasing the load on the filaments somewhat less tensioned, and so forth, until the filaments the least tensioned, the most tensioned reaching their resistance limit to traction and being ready to break.

There are solutions to limit the risks of undulation, but none is entirely satisfactory.

A first solution includes laying the strips with much control, avoiding any play and overlapping of the strips. Indeed, the compressed filaments have a tendency to slacken in the overlapping and play zones, creating undulations therein. In the absence of such zones, even the compressed filaments tend to keep their positions. Even if this solution makes it possible to limit the risks of undulation, it does not solve the problem of non-uniformity of the tensions of the filaments and causes a significant decrease in productivity.

In the case of a non-developable surface, another solution includes deviating from the rule of orientation of the fibers imposed by the research department by favoring laying trajectories that are closer to the geodesic trajectories imposed by the laying surface. This solution causes the mechanical characteristics of the part to be reduced. In addition, it does not overcome the undulation risks in the case of a laying in the area of a strongly pronounced radius of curvature.

In the case of a non-developable surface, another solution includes reducing the width of the strip so as to limit the length difference between the trajectory followed by the filaments laid in the area of a first edge of the strip and the trajectory followed by the filaments laid in the area of the other edge of the strip. This solution is not satisfactory as it causes the number of strips to be increased, and thus the productivity to be significantly lowered. According to another limitation, it does not solve the problems related to laying a strip in the area of a very pronounced radius of curvature.

In the case of a very pronounced radius of curvature, a solution includes limiting the thickness of the strip (low weight per unit area). This solution is not satisfactory as it causes the number of layers to be laid to be increased and thus reduces productivity significantly. In addition, it does not solve the problems related to laying a strip on a non-developable surface.

Consequently, the methods of the prior art do not provide optimum results in terms of quality and productivity.

Therefore, the present invention aims at overcoming the drawbacks of the prior art.

SUMMARY OF THE INVENTION

To this end, an object of the invention is a method for obtaining a composite material part from a preform of layers of fibers pre-impregnated with resin stacked on top of one another on a tool, the preform being delimited by a lower surface, an upper surface, and a peripheral flank. The invention also includes a method which includes attaching on the tool, after the last layer has been laid, a peripheral part comprising a wing adapted to cover the peripheral edge of the upper surface, so as to create, in the periphery of the preform, a peripheral cavity adjacent to the flank of the preform and, before the polymerization phase, to withdraw the gas present in the peripheral cavity so as to tension the filaments of the preform by exerting a traction force at the ends of the filaments.

This step of tensioning filaments makes it possible to balance the tensions of the filaments and to reduce the risks of undulation.

BRIEF DESCRIPTION OF THE DRAWINGS

Other characteristics and advantages will become apparent from the description of the invention that follows, a description given by way of non-limiting example, in view of the annexed drawings, wherein.

DETAILED DESCRIPTION OF THE PREFERRED EMBODIMENTS

Figure 1:
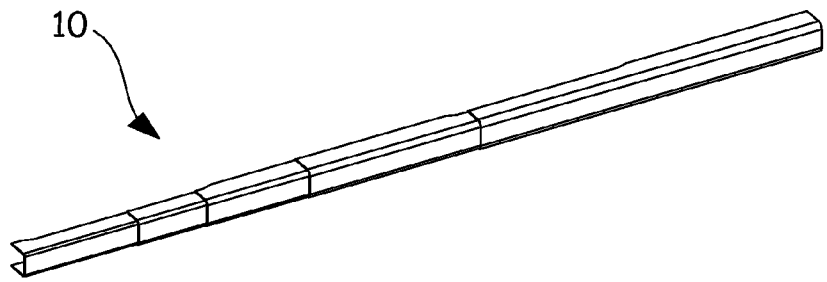
FIG. 1 is a perspective view of an example of a part made according to the method of the invention.
Figure 2:
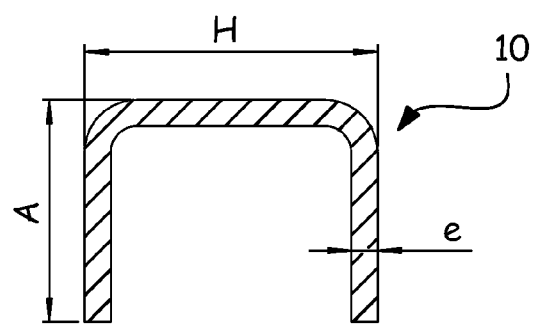
FIG. 2 is a transverse cross-section of the part shown in FIG. 1.

FIGS. 1 and 2 show a composite material part 10 having a U-shaped transverse cross-section. By way of example, such part can be used as a longeron for an aircraft wing. The thickness e of a longeron may vary from 7 to 25 mm, its height H may vary from 200 to 1500 mm, the width A of the wings may vary from 200 to 400 mm and its length can reach 10 m.

Naturally, the invention is not limited to this application. It can be used to make different parts from composite material. It is more particularly adapted when the part has a non-developable surface and/or a strongly pronounced radius of curvature.

The part 10 is obtained from a preform 12 of pre-impregnated fibers subjected to a polymerization cycle. Once finished, the part 10 comprises reinforcement fibers embedded in a resin matrix.

In general, the fibers are each constituted of a plurality of filaments. The materials of the filaments and the resin may vary as a function of the applications.

Figure 3:
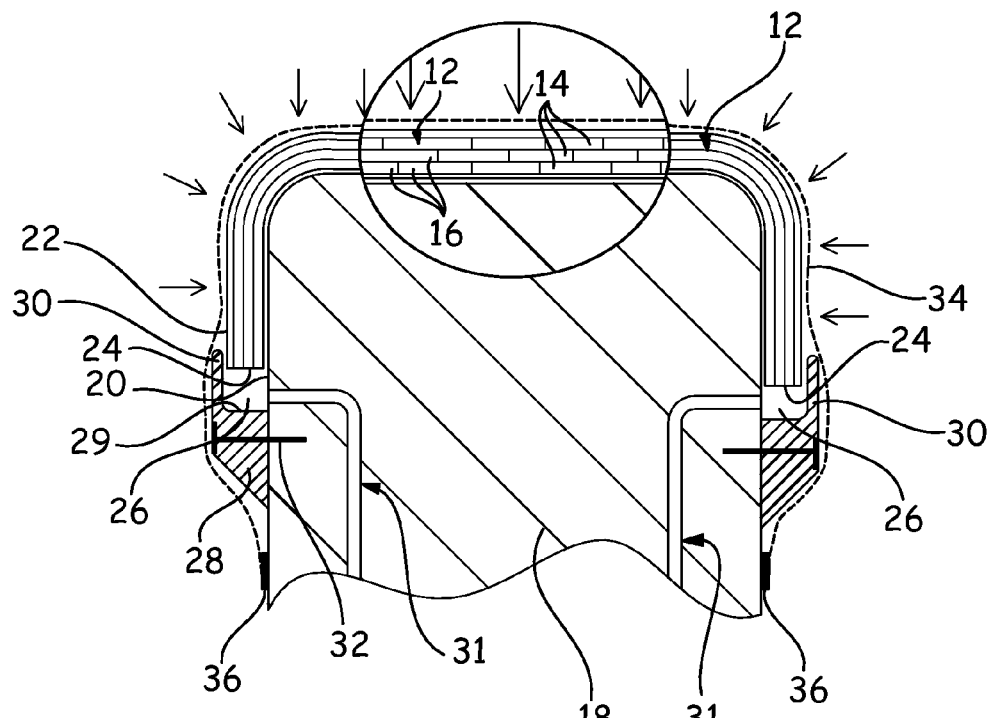
FIG. 3 is a cross-section showing a first tool for implementing the method according to the invention.
Figure 4:
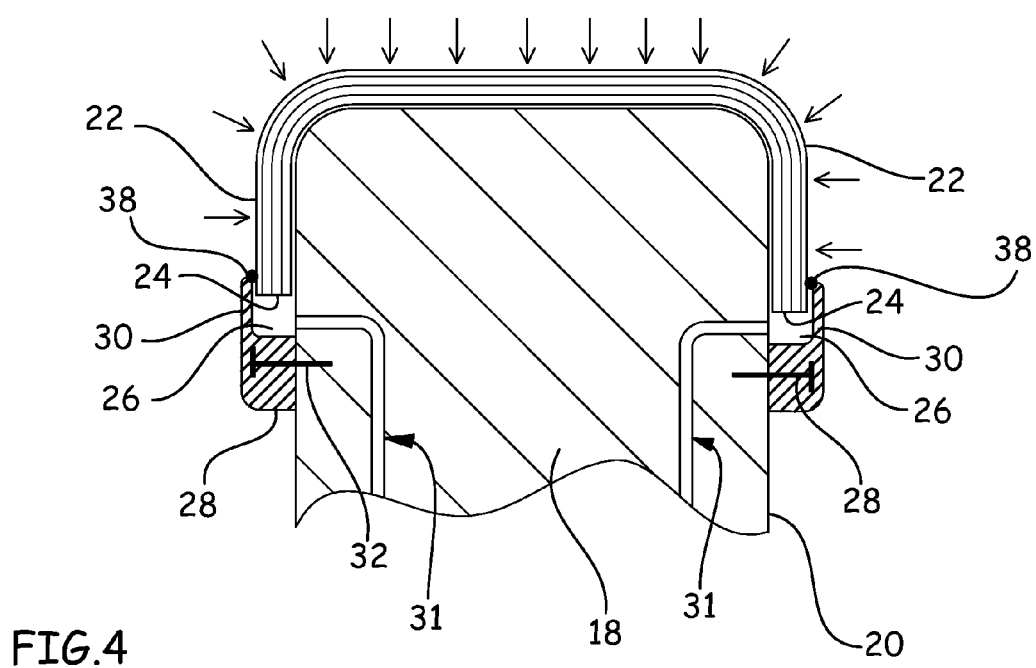
FIG. 4 is a cross-section showing another tool for implementing the method according to the invention.

According to an embodiment, as shown in FIGS. 3 and 4, the preform 12 of pre-impregnated fibers is obtained by stacking layers of fibers 14, the different layers comprising strips 16 of fibers adjacent to one another.

For each strip, the fibers are oriented along a unique direction parallel to the longitudinal direction of the strip (largest dimension of the strip).

Each strip is characterized by a width and a thickness which also corresponds to the weight per unit area of the strip. By way of example, the strip can have a width on the order of 5 to 10 mm and a thickness on the order of 0.3 mm.

The first layer of fibers is laid on a tool 18 having a convex laying surface 20 that complements one of the surfaces of the part to be made.

When all the layers of fibers have been laid on top of one another, the preform 12 is constituted.

No matter the mode for laying the fiber layers, the preform 12 is delimited by the lower surface of the first layer (flattened against the laying surface 20), by the upper surface 22 of the last layer laid, and by a peripheral flank 24 which extends over the entire periphery of the preform 12.

According to an embodiment of the invention, the majority of filaments forming the fibers comprise a first end arranged in the area of a first zone of the flank 24 and a second end arranged in the area of a second zone of the flank 24 spaced from the first zone.

According to an embodiment of the invention, the method for obtaining a composite material part comprises a step for tensioning the filaments of the preform not initially tensed during the phase for laying fiber layers before the polymerization phase. This step makes it possible to balance the tensions of the filaments and to reduce the risks of undulation. To cause the filaments to be tensioned, a traction force is applied at each end of the filaments. This traction force comes from a vacuum phenomenon in the area of at least one portion of the flank 24 of the preform. Preferably, the vacuum phenomenon is generated over the entire length of the flank 24 of the preform and over its entire height.

First or simultaneously with the vacuum phenomenon, the preform 12 is heated so the resin impregnating the fibers has a suitable viscosity allowing for an axial and relative sliding of the filaments. The preform will not undergo too great a temperature rise so as to not cause the fibers to be dried due to a resin that is too fluid.

Preferably, the viscosity of the resin will be comprised between 1000 and 50 Pa·s, which corresponds to a rise in temperature between 60 and 100° C.

To obtain the tension of the filaments, a pressure lower than the outer pressure of the preform 12 is created in a peripheral cavity 26 adjacent to the flank 24. By way of example, the peripheral cavity 26 has a substantially square section, a side being substantially equal to the height of the flank 24 of the part.

Advantageously, a pressure of less than 0.5 bar absolute is generated in the peripheral cavity 26.

According to an embodiment of the invention, the peripheral cavity 26 is delimited by the flank 24 of the preform, the laying surface 20 of the tool and a peripheral part 28 affixed to the tool 18 after the last layer has been laid, comprising a surface 29 away from the flank 24 and a wing 30 capable of covering the peripheral edge of the upper surface 22 of the last layer of fibers which was laid.

Also, the tool comprises a gas extraction device 31 opening out onto the peripheral cavity 26 to withdraw gas from the peripheral cavity 26. The gas extraction device 31 comprise at least one pipe which opens out into the area of the laying surface 20 between the flank 24 and the surface 29 of the peripheral part which are substantially parallel to one another and perpendicular to the laying surface 20.

The peripheral part 28 is made in one piece or in several sections placed end-to-end. It is connected to the tool by a connection arrangement 32 that can be disassembled, such as, for example, a plurality of screws.

A sealing device is provided to ensure the peripheral cavity 26 is leakproof.

According to a first embodiment shown in FIG. 3, the preform 12 and the peripheral part 28 are covered by a bladder 34 which is connected outside the peripheral part 28 to the tool by a sealing device 36. An outer pressure on the order of 7 bar is exerted outside the bladder 34, for example in an autoclave, so as to flatten the bladder against the preform and the peripheral part.

According to another embodiment shown in FIG. 4, the bladder 34 can be replaced by a sealing joint 38 sandwiched between the wing 30 and the peripheral edge of the upper surface 22. A sealing device can also be provided between the peripheral part 28 and the laying surface 20. The duration of the phase for tensioning the filaments is directly connected to the resin viscosity and to the over-length which is deemed necessary to be absorbed to eliminate any compression of the filaments.

Generally, the over-length of the filaments is estimated to be on the order of 1 to 3 mm.

Starting from the viscosity formula, $V=(k \cdot P \cdot e^2)/(2 \cdot n \cdot H)$ is obtained whereby V is the displacement speed of the filament in mm/s, k, the contraction phenomenon, P, the pressure in the peripheral cavity in Pa, e, the thickness of one layer in mm, n, the viscosity in Pa·s, and H, the distance in mm between the flank and the zone in the area of which the fiber presents the over-length.

By way of example, at 85° C., the resin has a viscosity n equal to 100 Pa·s. If one considers that the over-length is distant from the flank by a distance H equal to 400 mm, that the thickness of the layer is 0.3 mm, that k=0.05, and that the pressure is 7.105 Pa, a speed of 0.039 mm/s is thus obtained.

Thus, to absorb an over-length of 1 mm, the duration of the phase for tensioning filaments is on the order of 25 s.

For a pressure on the order of 1.105 Pa, an over-length of 1 mm can be absorbed in 3 min.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for obtaining a composite material part from a preform of layers of fibers pre-impregnated with resin stacked on top of one another on a tool, each fiber comprising a plurality of filaments, the preform being delimited by a lower surface, an upper surface, and a peripheral flank, the preform to be subjected to a polymerization phase, comprising the steps:
    attaching to the tool, after the last layer has been laid, a peripheral part comprising a wing adapted to cover a peripheral edge of the upper surface of the preform and the wing having a terminal end adjacent the peripheral edge, so as to generate, in the periphery of the preform, a peripheral cavity adjacent to the flank of the preform;
    sealing the peripheral cavity; and,
    withdrawing gas present in the peripheral cavity, before the polymerization phase, so as to tension filaments of the preform by exerting a traction force at ends of the filaments.

2. The method according to claim 1, further comprising sandwiching a sealing joint between the wing and the peripheral edge of the upper surface.

3. The method according to claim 1, wherein a viscosity of the resin is in the range between 1000 and 50 Pa·s during the step of tensioning the filaments.

4. The method according to claim 1, further comprising generating, in the area of the flank of the preform, a pressure of less than 0.5 bar absolute.

5. The method according to claim 1, further comprising covering the preform and the peripheral part with a bladder which is connected outside the peripheral part to the tool by a sealing device and exerting a pressure outside the bladder.

6. A tool for implementing a method for obtaining a composite material part from a preform of layers of fibers pre-impregnated with resin stacked on top of one another on a tool, each fiber comprising a plurality of filaments, the preform being delimited by a lower surface, an upper surface, and a peripheral flank, the preform to be subjected to a polymerization phase, the tool comprising:
    a laying surface to which layers of fibers are attached so as to form a preform delimited by a lower surface, an upper surface, and a peripheral flank;
    a peripheral part connected to the tool by a connection arrangement that can be disassembled, said peripheral part comprising a surface spaced apart from the flank and a wing adapted to cover a peripheral edge of the upper surface of the preform and the wing having a terminal end adjacent the peripheral edge;
    a device arranged to extract gas opening out of a peripheral cavity delimited by the flank of the preform, the laying surface, and the peripheral part; and
    a seal ensuring the peripheral cavity is leakproof.

7. The tool according to claim 6, wherein the tool comprises a bladder which covers the preform and the peripheral part and which is connected outside the peripheral part to the tool by a sealing device.

8. The tool according to claim 6, wherein the tool comprises a sealing joint sandwiched between the wing and the peripheral edge of the upper surface.

* * * * *